Feb. 28, 1950 D. D. GRIEG 2,498,678

MULTIPLEX ELECTRICAL PULSE COMMUNICATION SYSTEM

Filed Sept. 29, 1945 13 Sheets-Sheet 1

INVENTOR.
DONALD D. GRIEG

BY Percy P. Lantzy

ATTORNEY

INVENTOR.
DONALD D. GRIEG
BY Percy P. Lantzy
ATTORNEY

Feb. 28, 1950 D. D. GRIEG 2,498,678

MULTIPLEX ELECTRICAL PULSE COMMUNICATION SYSTEM

Filed Sept. 29, 1945 13 Sheets-Sheet 3

INVENTOR.
DONALD D. GRIEG

BY Percy P. Lantzy

ATTORNEY

INVENTOR.
DONALD D. GRIEG
BY Percy P. Lantzy
ATTORNEY

MULTIPLEX ELECTRICAL PULSE COMMUNICATION SYSTEM

Filed Sept. 29, 1945 13 Sheets-Sheet 5

TIME DEMODULATOR & RECEIVER CIRCUIT

INVENTOR.
DONALD D. GRIEG
BY Percy P. Lantzy
ATTORNEY

INVENTOR.
DONALD D. GRIEG
BY Percy P. Lantzy
ATTORNEY

Feb. 28, 1950 D. D. GRIEG 2,498,678

MULTIPLEX ELECTRICAL PULSE COMMUNICATION SYSTEM

Filed Sept. 29, 1945 13 Sheets-Sheet 7

INVENTOR.
DONALD D. GRIEG

BY Percy P. Lantzy

ATTORNEY

Feb. 28, 1950 D. D. GRIEG 2,498,678

MULTIPLEX ELECTRICAL PULSE COMMUNICATION SYSTEM

Filed Sept. 29, 1945 13 Sheets-Sheet 8

INVENTOR.
DONALD D. GRIEG

BY Percy P. Lantzy

ATTORNEY

INVENTOR.
DONALD D. GRIEG
BY Percy P. Lantzy
ATTORNEY

INVENTOR.
DONALD D. GRIEG
BY Percy P. Lantzy
ATTORNEY

INVENTOR.
DONALD D. GRIEG
BY Percy P. Lantzy
ATTORNEY

Feb. 28, 1950 D. D. GRIEG 2,498,678

MULTIPLEX ELECTRICAL PULSE COMMUNICATION SYSTEM

Filed Sept. 29, 1945 13 Sheets-Sheet 12

INVENTOR.
DONALD D. GRIEG

BY Percy P. Lantzy

ATTORNEY

INVENTOR.
DONALD D. GRIEG
BY Percy P. Lantzy
ATTORNEY

Patented Feb. 28, 1950

2,498,678

UNITED STATES PATENT OFFICE 2,498,678

MULTIPLEX ELECTRICAL PULSE COMMUNICATION SYSTEM

Donald D. Grieg, Forest Hills, N. Y., assignor to Federal Telephone and Radio Corporation, New York, N. Y., a corporation of Delaware Application September 29, 1945, Serial No. 619,405

16 Claims. (Cl. 179—15)

This invention relates to multichannel communication systems. More particularly it deals with the method and means for producing a complex pulse modulated wave wherein each pulse carries more than one signal channel.

It is an object of this invention to produce a complex pulse wave carrying a train of pulses wherein each pulse carries more than one signal in a novel and effective manner.

Another object is to transmit and receive such a complex pulse wave.

Another object is to multiplex the pulses of such a pulse wave vertically by stacking two or more signals in a step shaped pulse.

Another object is to horizontally multiplex such step shaped pulses by interleaving trains of them.

Another object is to demodulate such multiplexed pulse waves.

Another object is to width modulate different portions of each pulse.

Another object is to time modulate different portions of each pulse.

Another object is to time modulate the distance between two successive pulses of the same pulse train in accordance with a signal.

Another object is to time modulate both the leading and trailing edges of each pulse according to different signals.

Another object is to avoid cross-talk between two adjacent signal channels.

Another object is to provide means for carrying out the above objects.

Still other objects of this invention will appear from time to time in the description which follows.

Generally speaking, the means for producing the complex pulse wave of this invention comprises: (1) a plurality of sources of signal energy, such as code signals, audio signals, or the like; (2) means to produce a plurality of pulse trains respectively signal modulated with the energy from said sources; and (3) means to multiplex these pulse trains vertically, and then also horizontally, to produce the desired complex wave.

The means to produce these pulse trains comprises a base wave source or generator such as for producing a series of constant frequency pulses, a sine wave, a saw-tooth wave, or other wave from which pulses may be produced possessing a sloping leading and/or trailing edge. This wave is then signal modulated, delayed, clipped, differentiated, or the like, to produce separate trains of time modulated pulses one corresponding to each of the signals to be transmitted. The base wave may be signal modulated to produce: a train of pulses each one of which is width modulated, or a train of pulses which are time modulated, or a train of pulses in which either the leading edge or the trailing edge or both edges of each pulse are time modulated.

The resulting pulse trains are then mixed to produce a complex pulse wave wherein the signal pulses of at least two trains are vertically multiplexed by superposing one upon the other to produce a step shaped pulse. Trains of these step shaped pulses may further be horizontally multiplexed by interleaving them. One step shaped pulse may contain more than one type of modulated signal energy, for example, the lower steps may be width modulated and the upper steps may be time modulated. In order to facilitate in the demodulation of trains of horizontally multiplexed pulses, a synchronizing pulse of different shape, amplitude, and/or width, may be interleaved between the pulses at regular intervals.

The complex waves thus produced may be transmitted at ultra high frequency by radio or by wire. The transmitted wave is received and demodulated first, by dividing the complex wave of the separate trains of pulses one corresponding to each signal channel and, then, demodulating the resulting separate pulse trains. The separation means may comprise blocking means if the complex wave is horizontally multiplexed, and clipping means for separating the different pulse signals on each step of the step shaped pulses. When the leading edge of a separated pulse is modulated according to a different signal than the trailing edge of that pulse, these two edges may be separated by differentiating the clipped pulse train to segregate the leading edge channel, then phase inverting the resulting differentiated pulse wave to segregate the trailing edge channel.

These and other objects and features of this invention will become more apparent upon consideration of the following detailed descriptions of a few illustrative embodiments of the invention to be read in connection with the accompanying drawings in which:

Fig. 22 is a schematic block wiring diagram of a system for demodulating the horizontally multiplexed pulse wave produced in the system of Fig. 20.

This specification is divided into the following chapters:

Chapter I–A is illustrated by Figs. 1–5 which discloses a system for producing and demodulating a step shaped pulse wave in which the horizontal width of the pulse at each step is modulated according to a different signal; and in which a time modulated pulse is superimposed upon the top of each step shaped pulse.

Chapter I–B illustrated by Figs. 6–9, discloses a system for producing and demodulating a complex step shaped pulse wave in which the width of each step of the pulses is the same but the time distance between the corresponding step on two adjacent pulses is varied according to a given signal.

Chapter I–C illustrated by Figs. 10–15, discloses two systems for producing and one system for demodulating a complex pulse wave in which each edge of each step of the pulses is modulated according to a different signal.

Chapter II–A illustrated by Figs. 16–19, discloses one embodiment of a system for producing and separating horizontally multiplexed step shaped pulses produced according to the systems in the above figures.

Figure 20:
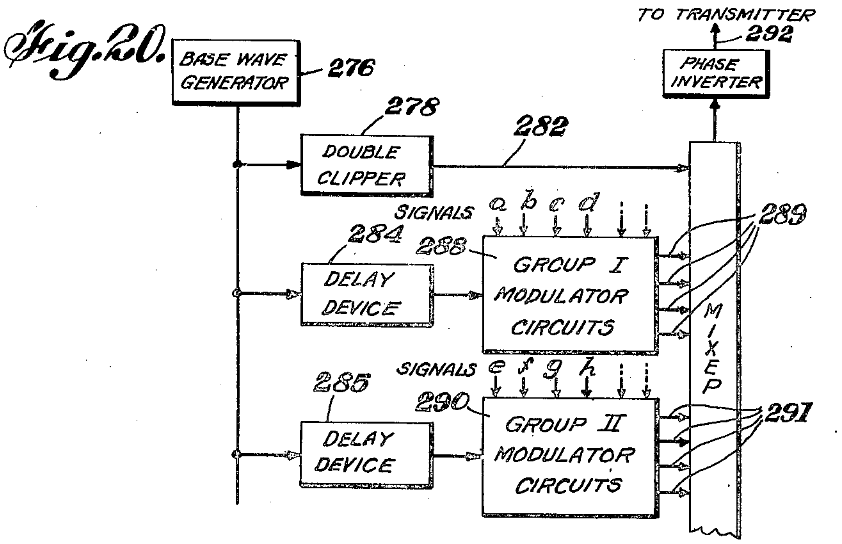
Fig. 20 is a schematic block wiring diagram of another type of horizontal multiplexing system wherein a synchronizing pulse is generated to separate each group of different step shaped pulses.
Figure 21:
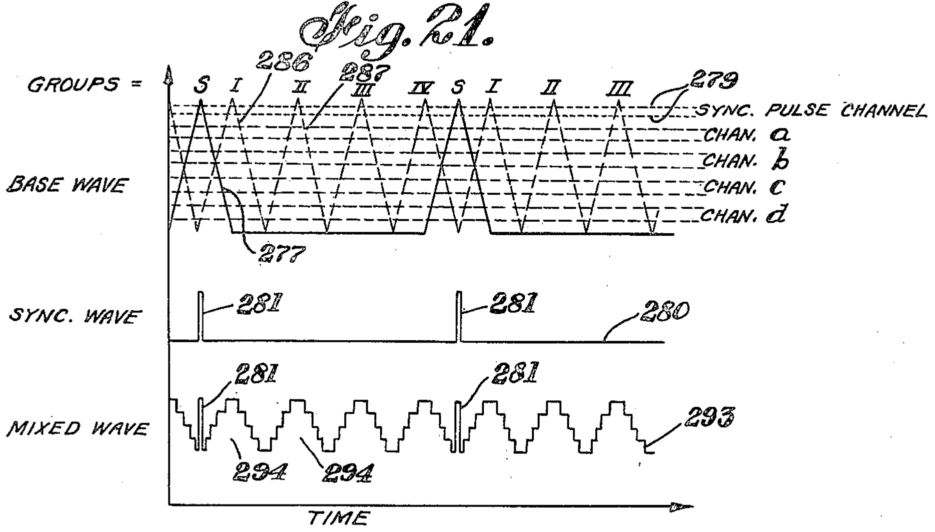
Fig. 21 is a graph of wave forms useful in explaining the operation of the system of Fig. 20.
Figure 21:
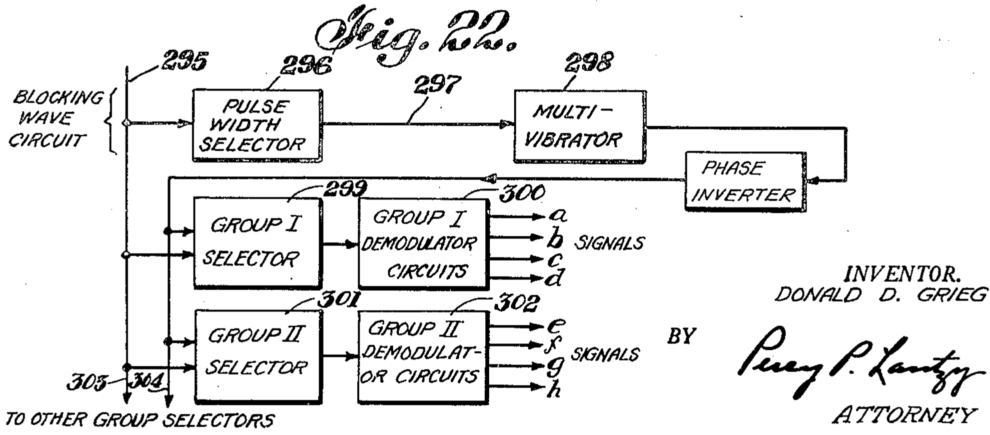

Chapter II–B illustrated by Figs. 20–22, discloses another embodiment of a system for producing and separating horizontally multiplexed step shaped pulses incorporating a synchronizing pulse at regular intervals between the step shaped pulses of a complex pulse wave.

Chapter I deals only with complex waves having vertically multiplexed signal channels and Chapter II deals with complex waves having both vertically and horizontally multiplexed signal channels.

*Chapter I–A*

Figure 1:
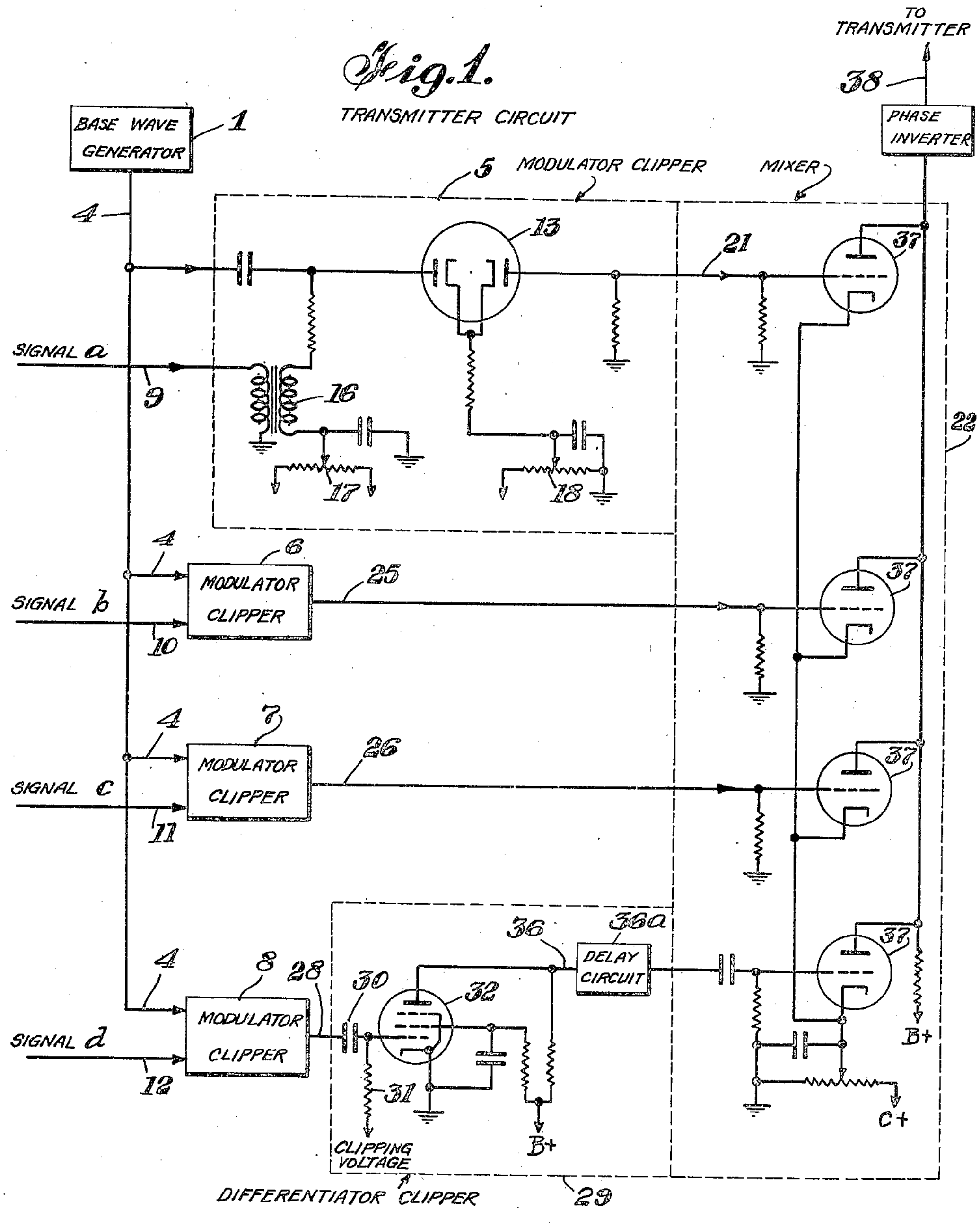
Fig. 1 is a schematic wiring diagram partially in block of one embodiment of this invention for producing a vertically multiplexed complex step shaped pulse wave.
Figure 2:
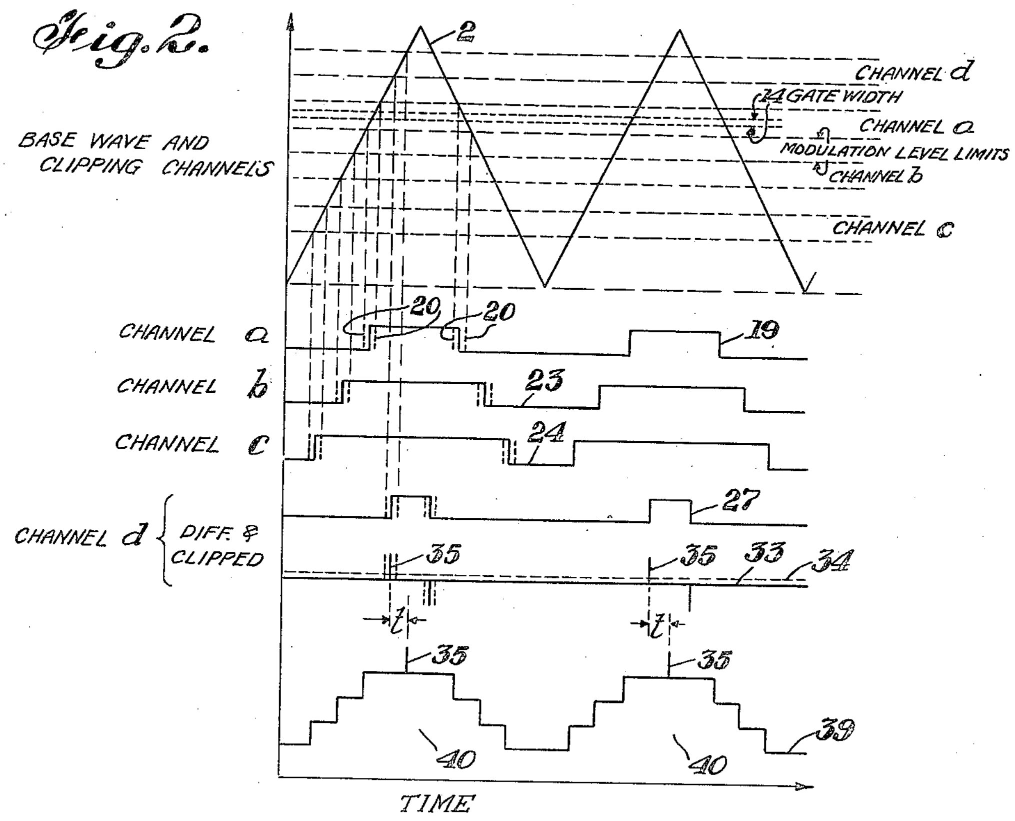
Fig. 2 is a graph of the wave forms useful in explaining the operation of the system shown in Fig. 1.
Figure 3:
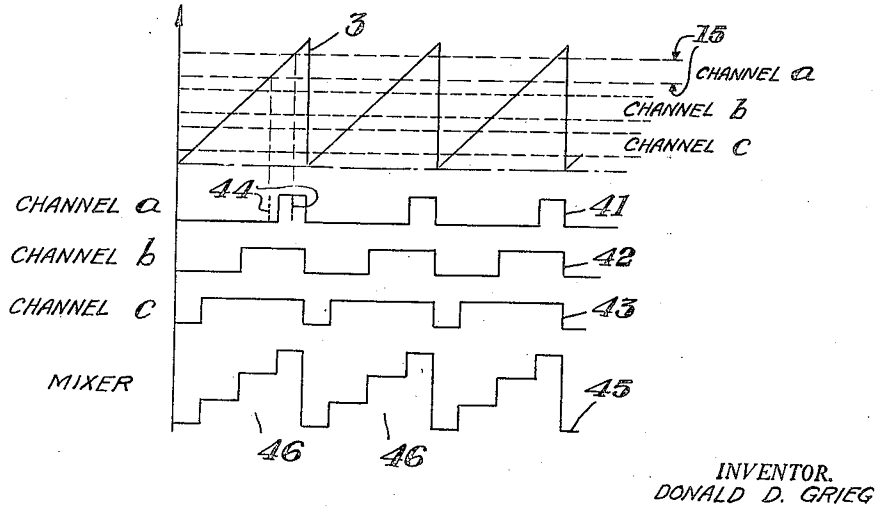
Fig. 3 is a graph of a group of wave forms which may be produced in accordance with a variation of operation of the system shown in Fig. 1.

Referring to Figs. 1 and 2, the base wave generator 1 may produce the wave 2 shown in Fig. 2 or the wave 3 shown in Fig. 3. This wave passes through lines 4 to modulator clippers 5, 6, 7 and 8 and may also pass to other modulator clippers, if desired. Coupled with each modulator clipper is a source of signal energy, namely signals *a*, *b*, *c* and *d* introduced through lines 9, 10, 11 and 12 respectively. The circuit of a modulator clipper may comprise a double diode 13 to produce constant width clipping levels 14 that vary from less to more positive positions between limits 15 in accordance with the signal *a* connected through transformer 16. The variable resistances 17 and 18 determine the width between the clipping levels 14. Since the clipping levels 14 vary vertically along the sloping portion of the wave 2, the edges of the pulses of clipped pulse train 19 are horizontally or width modulated within the limits 20. The train 19 then passes through line 21 to the mixer 22. Similarly, in modulator clippers 6 and 7 the signals *b* and *c* produce the pulse trains 23 and 24 which also pass into the mixer 22 through lines 25 and 26, respectively.

As distinguished from signals *a*, *b* and *c*, signal *d* may be time modulated. This may be carried out by differentiating and clipping the pulse train 27 produced in the modulator clipper 8 and passing it through line 28 to the differentiator clipper 29. The differentiator clipper 29 may comprise a differentiating circuit of condenser 30 and resistor 31 and a clipper tube 32 which may have its clipping voltage applied through the resistor 31. From the differentiator is withdrawn pulse train 33 which is clipped along level 34 to remove only the positive pulses 35. These pulses 35 are withdrawn from the plate of tube 32 through the line 36, to the mixer 22. When the top width of pulse 19 is very narrow, the pulses 35 may be retarded by a delay circuit 36*a* an amount $t_d$ so as to more closely center the pulses 35 with respect to the pulses 19.

The mixer 22 may comprise a network of triodes 37, one for each channel, thus preventing feedback of energy from one channel to another. The plates of all the tubes 37 are connected together through line 38 to a suitable ultra high frequency transmitter. Line 38 carries the complex vertically multiplexed step shaped pulse wave 39 in which each of the pulse trains 19, 23, 24, 35, are superimposed or stacked vertically to form the step pulses 40 with the time modulated pulses 35 from pulse train 27 on the top of each step pulse 40. It is desirable that the clipping operations for channels *a*, *b*, *c* and *d* occur at spaced levels along the edge of the waves 2 or 3 so that the pulses of different trains will have different widths to permit stacking and so that a suitable space is allowed between each of the level limits 15 to prevent cross talk from one channel to another.

In Fig. 3 pulse trains 41, 42, and 43 are produced to correspond to channels *a*, *b* and *c* and to pulse trains 19, 23 and 24 of Fig. 2. Only the leading edges of the pulses of trains 41, 42 and 43 are modulated within the limits 44 because of the shape of the wave 3. The resulting complex wave 45 has step shaped pulses 46 corresponding to complex wave 39 and pulses 40.

Figure 4:
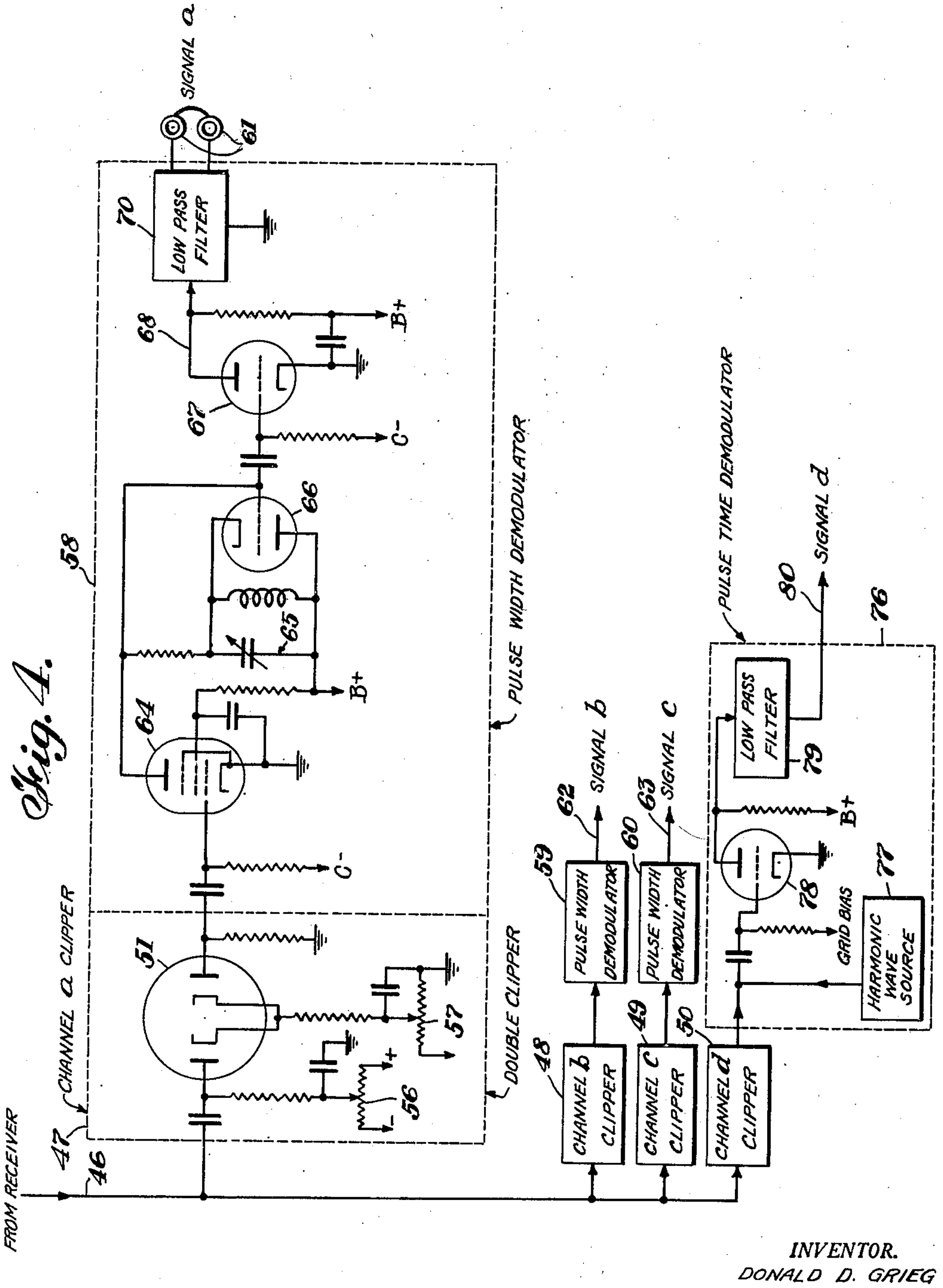
Fig. 4 is a schematic wiring diagram partially in block of a demodulating system for the complex wave produced in the system of Fig. 1.
Figure 5:
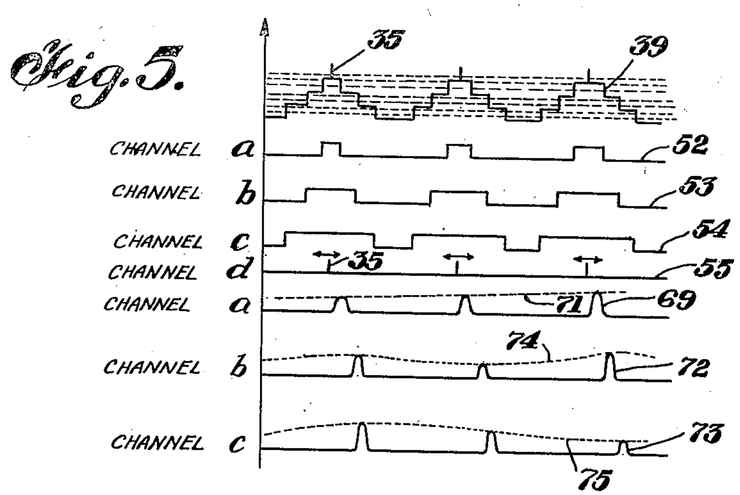
Fig. 5 is a graph of the wave forms useful in explaining the operation of the system shown in Fig. 4.

Referring to Figs. 4 and 5, the transmitted complex pulse wave 39 or 45 is received over line 46 separately connected to channel clippers 47, 48, 49 and 50 corresponding to the channels *a*, *b*, *c* and *d* respectively. The channel clipper may comprise a double diode 51 connected similarly to the double diode 13, shown in Fig. 1 for clipping off pulse trains 52, 53, 54 and 55 corresponding to pulse trains 19, 23, 24, and 35 of channels *a*, *b*, *c* and *d* respectively. By adjusting the values of the resistances 56 and 57, different steps of the step shaped pulses 40 or 46 are selected. The resulting separated width modulated pulse trains 52, 53 and 54 are then respectively passed through pulse width demodulator circuits 58, 59, and 60 from which signals *a*, *b*, and *c* are withdrawn through lines 61, 62 and 63. The pulse width demodulator may be of the type disclosed in my copending application, Serial No. 547,124 filed July 29, 1944, now Patent No. 2,421,025, granted May 28, 1947, comprising a pentode tube 64 for amplifying the current in the pulses before it is passed into the oscillating time constant circuit 65 (of an inductance and capacitance) which is tuned to convert the width modulated pulses into amplitude modulated pulses. The unwanted portions of the waves produced by the oscillating circuit 65 are damped in the damping tube 66 and the resulting wave portions are then clipped in the clipping tube 67 so that only the first undulation of the wave produced from each pulse is passed through line 68 as pulse wave 69 into a low pass filter 70 from which is withdrawn signal wave 71 through line 61. Pulse waves 72 and 73, from which are produced signal waves 74 and 75 are withdrawn through lines 62 and 63, respectively and correspond to signals *b* and *c*.

The time spaced pulses 35 of the separated pulse train 55 may be demodulated in the time demodulator 76, similar to that described in my copending application, Ser. No. 459,959, filed September 28, 1942, now Patent No. 2,416,306, granted January 27, 1948. This demodulator comprises mixing the pulse train 55 with a harmonic wave from source 77 in the tube 78, and then passing the resulting mixed wave, which preferably is clipped by a suitable grid bias through a low pass filter 79, similar to that of 70, from which is withdrawn the signal *d* through line 80.

*Chapter I–B*

Figure 6:
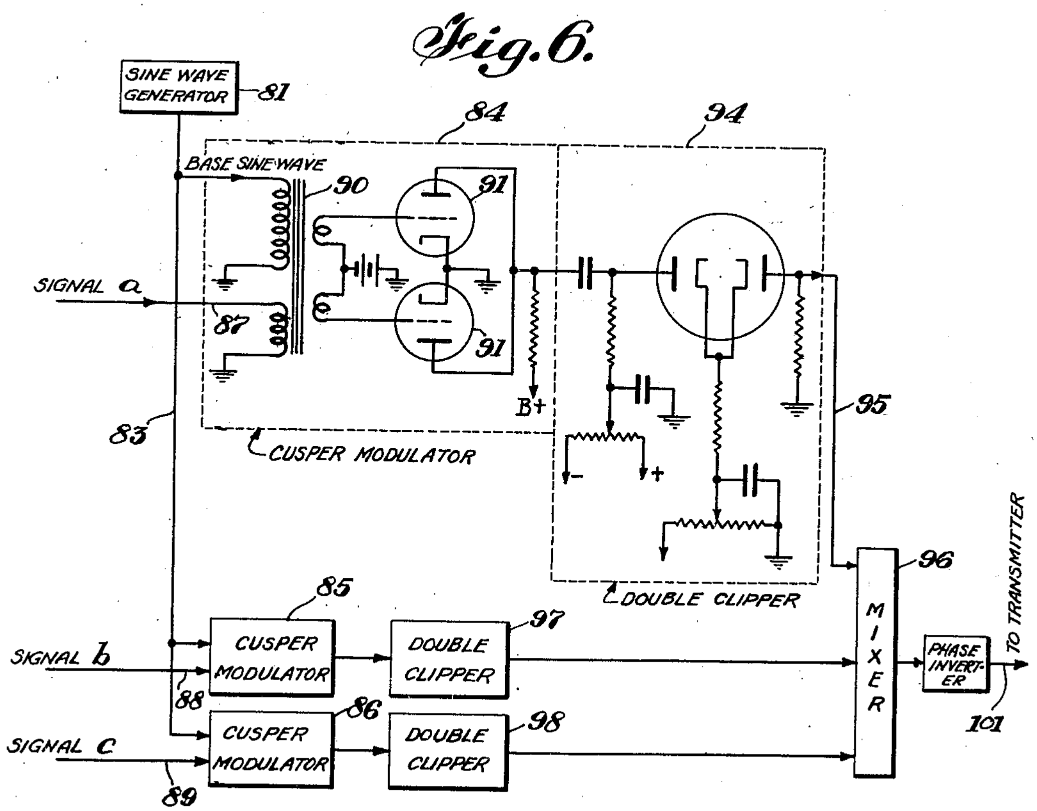
Fig. 6 is a schematic wiring diagram partially in block of another embodiment of this invention for producing a vertically modulated complex step shaped pulse wave.
Figure 7:
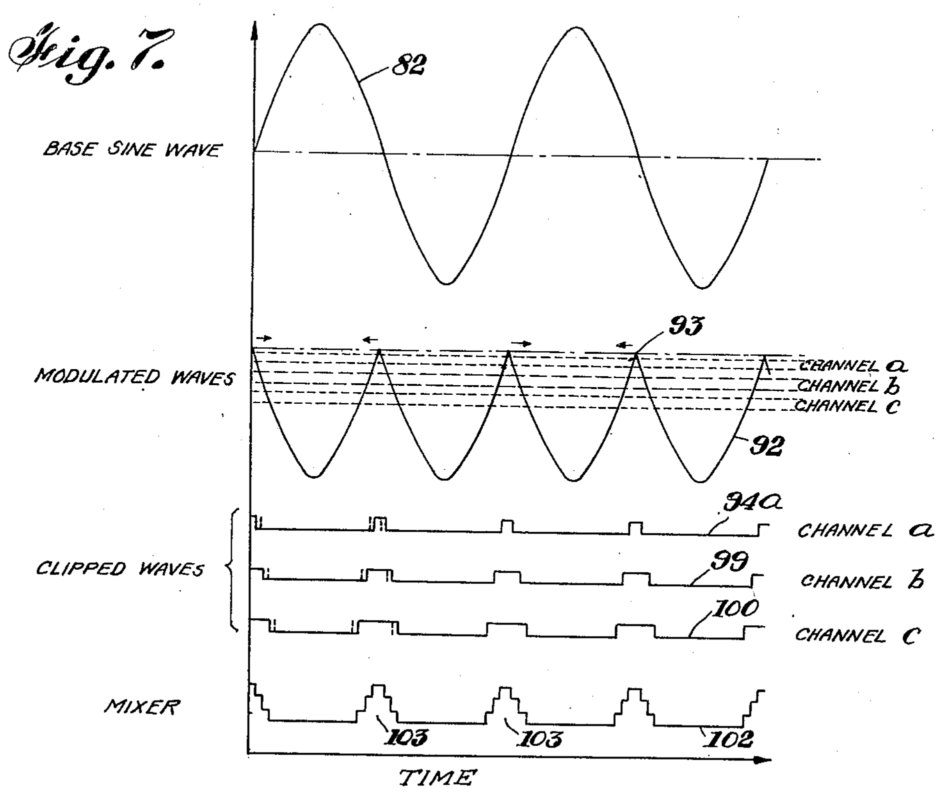
Fig. 7 is a graph of the wave forms useful in explaining the operation of the system shown in Fig. 6.

Referring now to Figs. 6 and 7 for the production of time modulated pulses of equal width there is shown a sine wave generator 81 for producing the sine wave 82 which is coupled through line 83 to cusper modulators 84, 85 and 86 to which are also coupled signal energies from signals *a*, *b*, and *c* through lines 87, 88 and 89 respectively. The cusper modulator may be similar to that described in my joint copending application, Ser. No. 455,898, filed August 24, 1942, now Patent No. 2,434,936, granted January 27, 1948, wherein the base sine wave and signal energy wave comprise the primary of transformer 90. From the secondary are coupled a pair of equally biased triodes 91 to rectify the sine wave 82 and to produce wave 92 having cusps 93 time modulated in pairs toward and away from each other corresponding to the signal energy impressed on the primary through line 87. The resulting cusp modulated wave is then clipped at the level of channel *a* shown in Fig. 7 by the double clipper 94, similar to that shown at 47 in Fig. 4, to produce a pulse train 94*a* which is withdrawn through line 95, to mixer 96. Signals *b* and *c* are similarly modulated on the cusp wave 92, but are clipped at different channel levels *b* and *c* as shown in Fig. 7 by double clippers 97 and 98, respectively, to produce pulse trains 99 and 100 which are passed to mixer 96. Mixer 96 may be similar to mixer 22 shown in Fig. 1. The vertically multiplexed complex wave from mixer 96 and withdrawn through line 101 for transmission, is shown at 102 in Fig. 7 having step shaped pulses 103 produced by superimposing the pulses of trains 94, 99 and 100.

Figure 8:
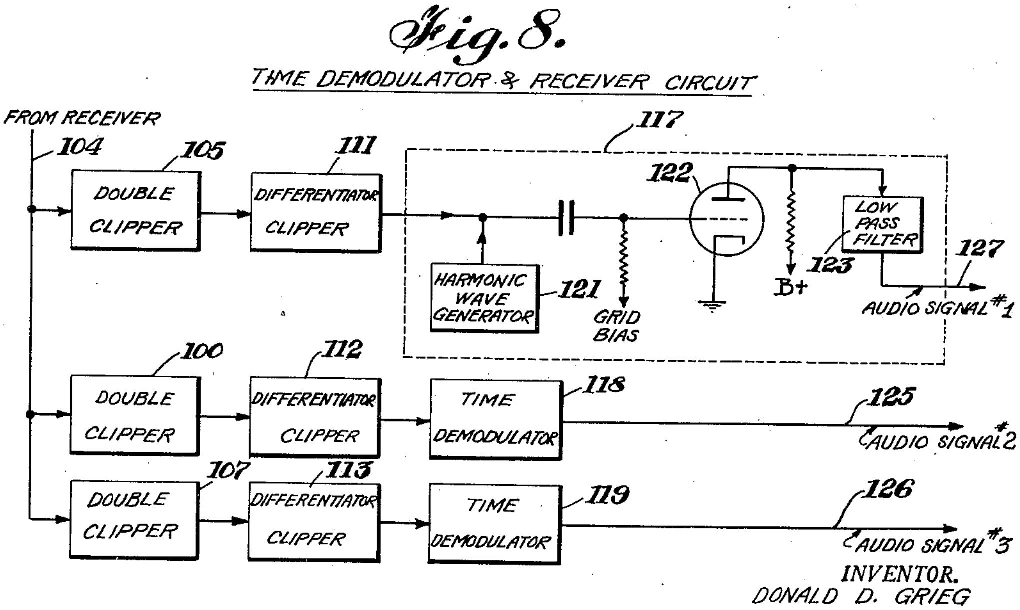
Fig. 8 is a schematic wiring diagram mostly in block of a system for demodulating the complex wave formed in the system of Fig. 6.
Figure 9:
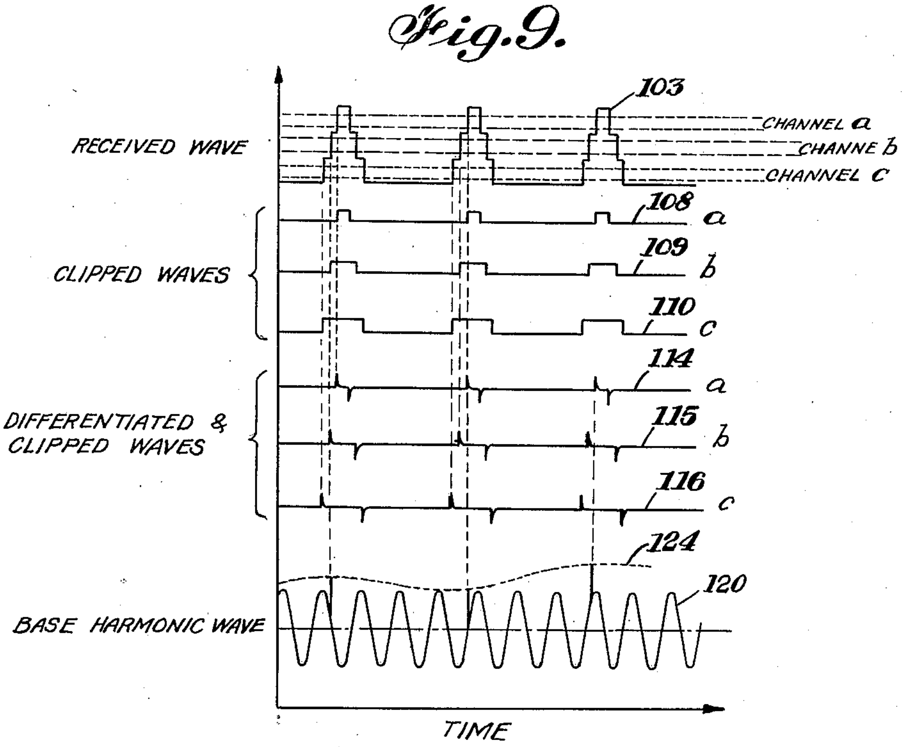
Fig. 9 is a graph of the wave forms useful in explaining the operation of the system shown in Fig. 8.

The vertically multiplexed complex pulse wave 103 may be demodulated in the system shown in Figs. 8 and 9 by passing from line 104 through a series of double clippers 105, 106, 107, similar to the double clipper 96 or 47 above mentioned, wherein each step of the pulses of wave 103 is divided into pulse trains 108, 109, 110 corresponding to channels *a*, *b*, and *c*. These trains 108, 109, 110 are then passed through differentiator clippers 111, 112 and 113, respectively, (similar to differentiator clipper 29 shown in Fig. 1) from which are withdrawn only the positive pulses of trains 114, 115, 116. These pulses are then time demodulated in time demodulator circuits 117, 118 and 119, similar to that shown at 76 in Fig. 4. In Fig. 9 is shown the harmonic wave 120 from harmonic wave generator 121, upon which there is superimposed the positive pulses of wave 114, amplified in tube 122. After passing the resulting wave through the low pass filter 123, the signal wave 124 is withdrawn through line 125. Similarly signals *b* and *c* are withdrawn through line 126 and 127 respectively.

*Chapter I–C*

Figure 10:
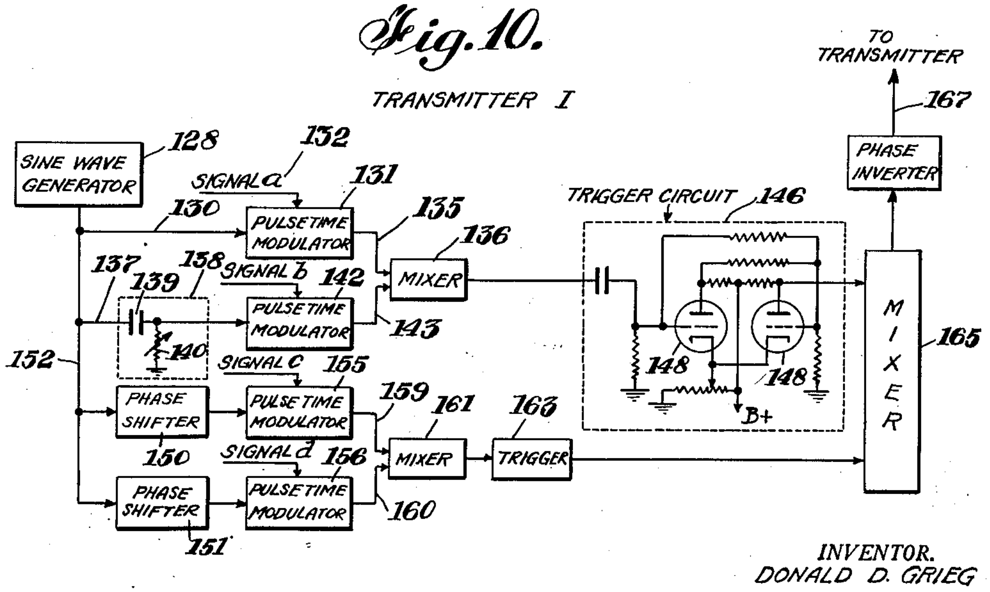
Fig. 10 is a schematic wiring diagram partially in block of another embodiment of this invention for producing a vertically multiplexed complex step shaped pulse wave.
Figure 11:
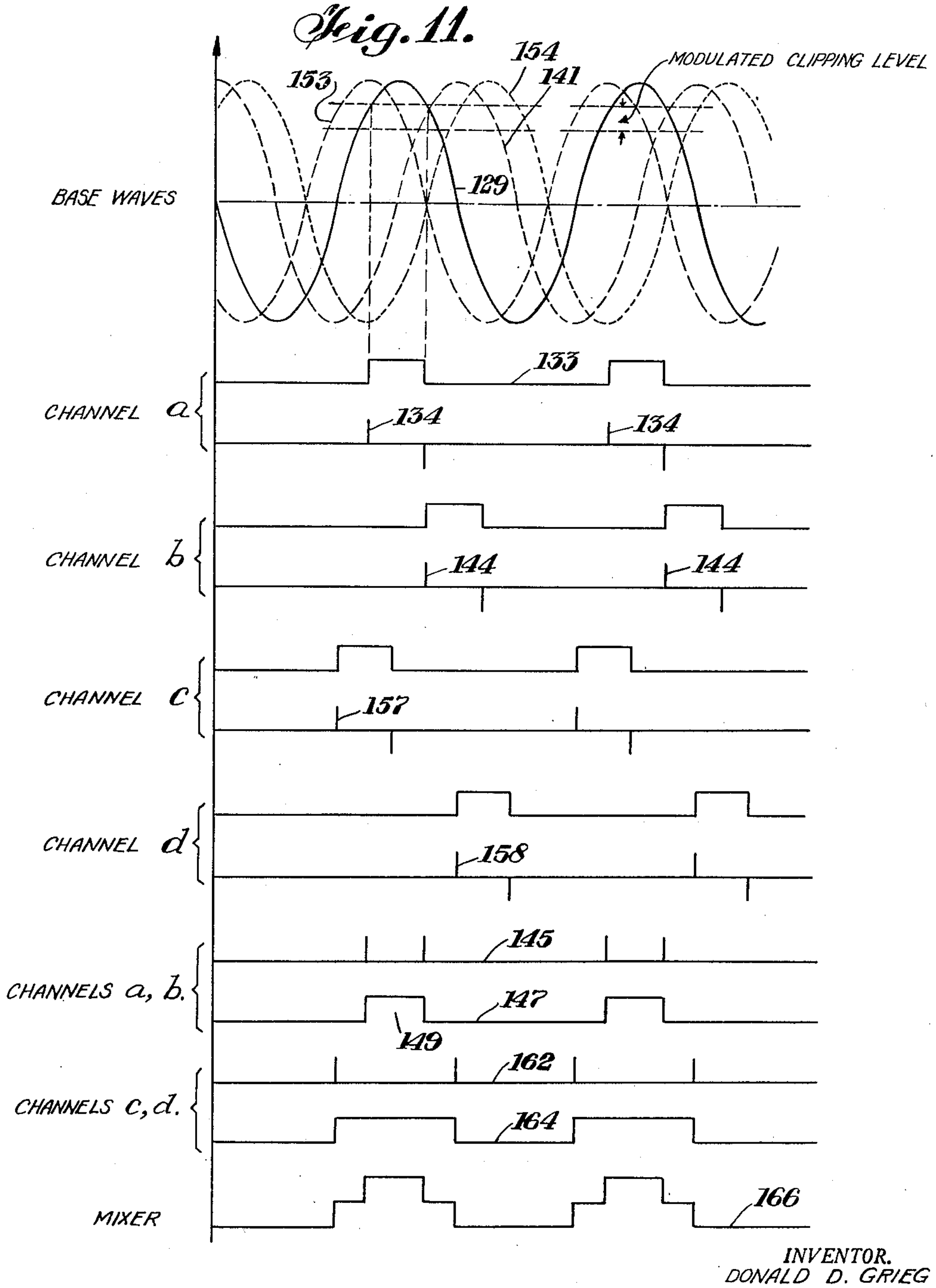
Fig. 11 is a graph of the wave forms useful in explaining the operation of the system shown in Fig. 10.

Another system for producing vertically multiplexed step shaped pulses comprises modulating both the leading and the trailing edges of each pulse according to different signals. One embodiment of such a system is shown in Figs. 10 and 11 wherein sine wave generator 128 produces the sine wave 129 and passes it through line 130 to a pulse time modulator 131 into which is also introduced signal energy from signal *a* through line 132. Pulse time modulator 131 may comprise a modulator clipper, similar to that shown at 5 in Fig. 1, to produce a pulse train 133, and a differentiator clipper, similar to that shown at 29 in Fig. 1 from which is withdrawn a wave having positive pulses 134 corresponding only to the leading edge of the pulses in train 133. These pulses 134 are then passed through line 135 into mixer 136.

To produce the pulses for signal *b* the base sine wave 129 may be passed through line 137 into a suitable delay device such as phase shifter 138 comprising a condenser 139 and resistance 140, from which is withdrawn the delayed sine wave 141 shown in dotted lines in Fig. 11. Signal *b* is then time modulated from wave 141, similar to wave 129, in the pulse time modulator 142 from which is withdrawn (through line 143) a series of positive pulses 144 and passed into the mixer 136. Mixer 136 may comprise a pair of triodes connected similarly to those shown in mixer 22 in Fig. 1. From mixer 136 is withdrawn the two channel pulse train 145 which is passed into the trigger circuit 146 to produce pulse train 147. This trigger circuit comprises two triodes 148, one of which fires to pass current in response to pulse 134 and continues to pass current until pulse 144 cuts it out and causes the other tube to fire and remain conductive until the next pulse 134 again fires the first tube. This circuit couples adjacent pairs of pulses 134 and 144, to produce the leading and trailing edges respectively of a new pulse 149 on pulse train 147.

Similarly, other phase shifters 150 and 151 delay the base sine wave from line 152 to produce delayed waves 153 and 154 which are correspondingly passed through pulse time modulators 155 and 156 to produce trains of positive pulses 157 and 158 corresponding to signals *c* and *d*. These pulses are then passed through lines 159 and 160 to the mixer 161 to produce two channel pulse train 162 and thence to a trigger circuit 163 similar to 146 to produce the pulse train 164. The pulse trains 147 and 164 are mixed in mixer 165 to produce the vertically multiplexed complex pulse wave 166 which is withdrawn through line 167 for transmission.

Figures 12, 13:
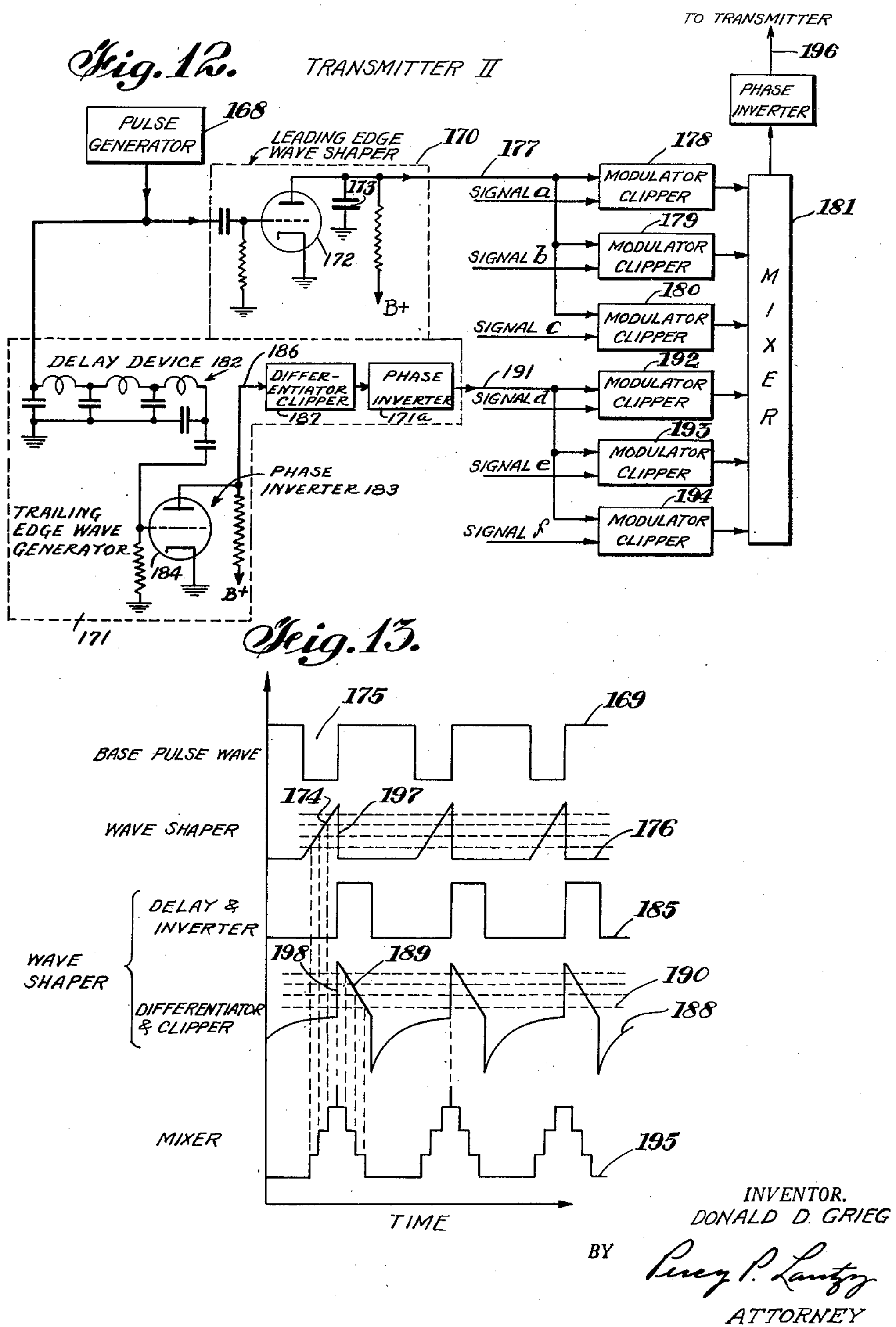
Fig. 12 is a schematic wiring diagram partially in block of another system for producing a vertically multiplex complex step shaped pulse wave similar to that shown in Fig. 10.
Fig. 13 is a graph of the wave forms useful in explaining the operation of the system of Fig. 12.

Another system is shown in Figs. 12 and 13 for producing a wave similar to wave 166 having both the leading edge and the trailing edge of each step of each pulse modulated according to a different signal. A pulse wave generator 168, which produces a wave similar to that shown at 169 in Fig. 13, is coupled respectively to two separate wave shapers: leading edge wave shaper 170 and trailing edge wave shaper 171.

Wave shaper 170 comprises a triode 172 and a condenser 173 for inverting and producing pulses having a sloping leading edge 174 from the pulses 175 of wave 169. The resulting wave 176 passes through line 177 to separate modulator-clippers 178, 179 and 180, similar to those shown in Fig. 1, where each of the pulses of wave 176 are clipped at different levels corresponding to signals *a*, *c* and *e* to produce pulse trains similar to those shown in Fig. 3, and passed to the mixer 181.

Wave shaper 171 comprises a suitable delay device 182 which may consist of a network of inductances and capacitances to assimilate a transmission line. The resulting delayed base wave is then passed through a phase inverter 183 comprising a triode 184 and connecting circuits from which is withdrawn through line 186 an inverted and delayed pulse wave 185. This pulse wave 185 is delayed sufficiently so that the vertically trailing edge of the pulses on wave 176 are in synchronism and alignment with the vertical leading edge of the pulses on wave 185. Wave 185 then passes through the differentiator clipper 187, similar to that shown at 29 in Fig. 1, wherein wave 188 is produced and the positive pulses thereof having trailing sloping edges 189 are clipped from the remainder of the wave along line 190. Since the clipping tube in the differentiator clipper 187 inverts the wave 188 it is then passed through another phase inverter 171*a* similar to 183 to produce the positive pulses 189. These positive pulses 189 are then passed through line 191 to another group of modulator clippers 192, 193, 194 similar to modulator clippers 178, 179, 180. Each one of the modulator clippers 192, 193, 194, are respectively connected with signals *b*, *d* and *f* from which are produced a series of pulse modulated wave trains as from wave 176, which trains are also passed to mixer 181. The addition and combination of these pulse trains in mixer 181 forms the complex step shaped pulse wave 195 which is passed through line 196 to a suitable transmitter. In combining the pulse trains from waves 176 and 188, there may be an instantaneous vertical pulse (not shown) corresponding with the edges 197 and 198 of the pulses of these two pulse waves. However, if such an instantaneous pulse is objectionable it may be removed by passing the wave 195 through a filter device (not shown).

Figure 14:
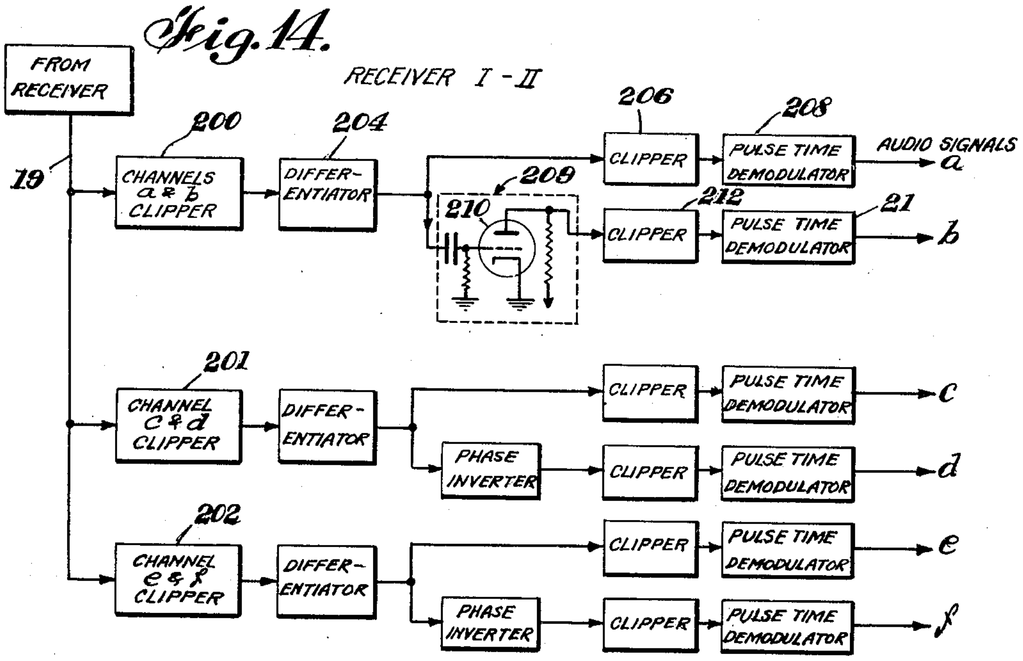
Fig. 14 is a schematic wiring diagram partially in block showing a system for demodulating the complex wave formed in the system shown in Fig. 10 or Fig. 12.
Figure 15:
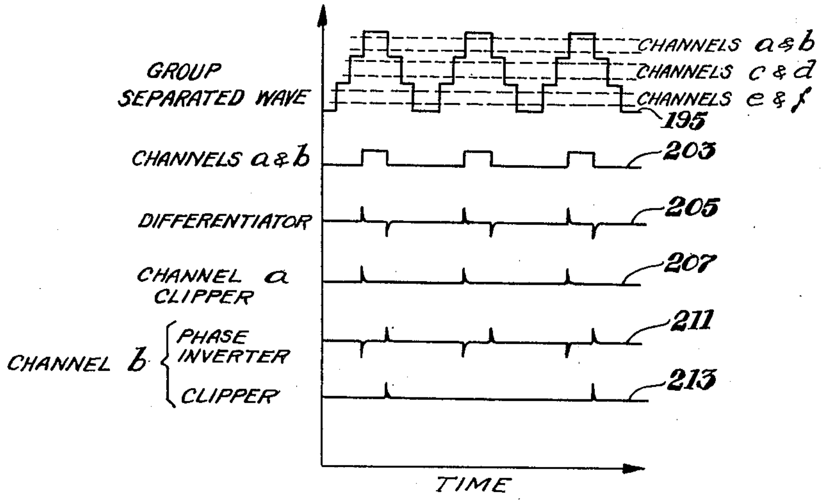
Fig. 15 is a graph of the wave forms useful in explaining the operation of the system shown in Fig. 14.

A suitable system for demodulating complex wave 166 or 195 is shown in Figs. 14 and 15 wherein the received complex wave passes through line 199 to respective channel clippers 200, 201, 202, for separating the steps of the step shaped pulses by clipping pulse trains for channels *a* and *b*, *c* and *d*, and *e* and *f* as shown in Fig. 15. The pulse train 203 of channels *a* and *b* is passed through differentiator 204 from which is withdrawn pulse train wave 205. This train wave 205 is then passed through clipper 206 wherein the positive pulses of the wave 205 are passed to form pulse train 207 corresponding to signal channel *a*. Train 207 is then demodulated in pulse time demodulator 208 from which is withdrawn the signal *a*. This signal *a* corresponds to the leading edge of the top step pulse of complex pulse wave 195. The differentiated train wave 205 from differentiator 204 is also passed through the phase inverter 209 which may comprise a triode 210 from the plate of which is withdrawn pulse train wave 211. Wave 211 is then clipped in clipper 212 (similar to 206) to produce the pulse train 213 corresponding to signal channel *b*. Train 213 is then demodulated in pulse time demodulator 214 from which is withdrawn the signal *b* corresponding to the trailing edge of the top step of the pulse of complex pulse wave 195. Similarly signals *c*, *d*, *e* and *f* are separated from the complex wave 195 according to the circuit shown in Fig. 14.

*Chapter II–A*

Figures 16, 17:
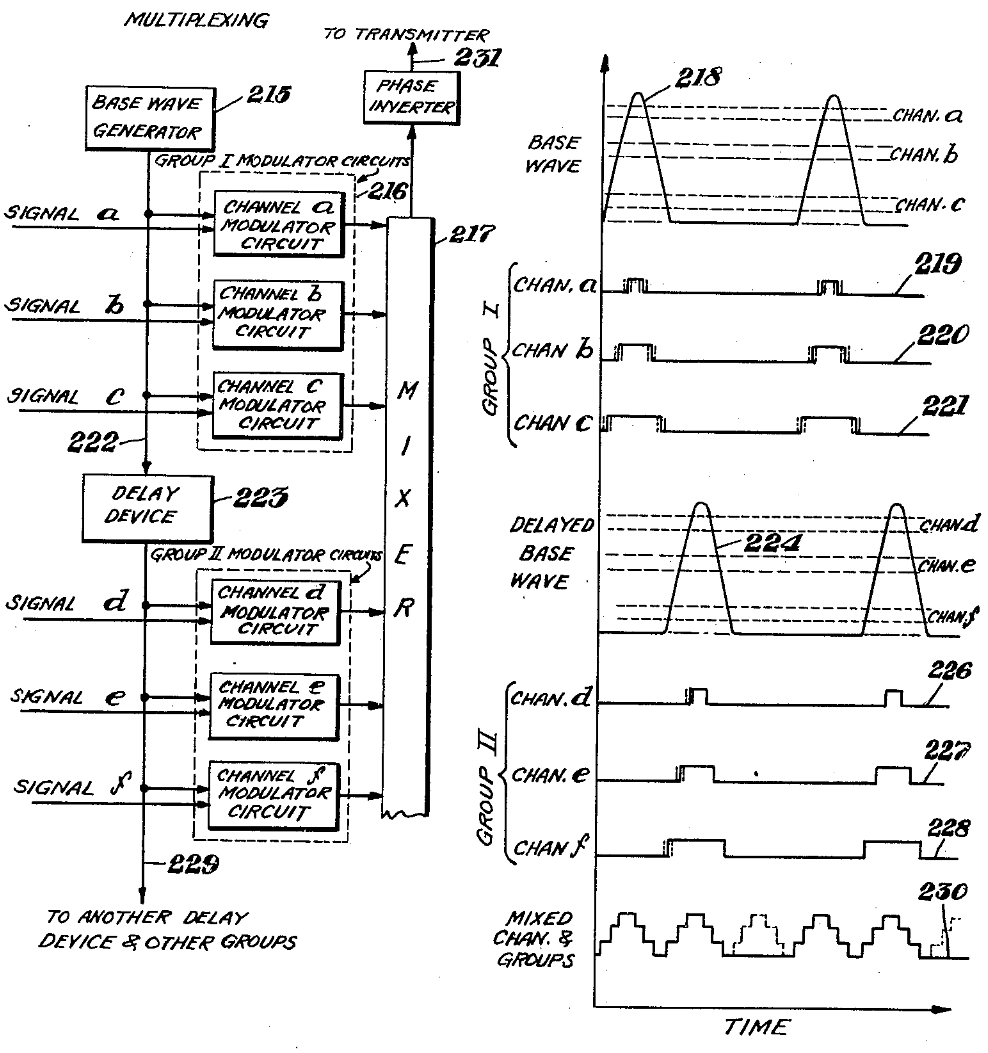
Fig. 16 is a schematic block diagram of an embodiment for horizontally multiplexing the vertically multiplexed signal pulses produced by any of the previously disclosed systems.
Fig. 17 is a graph of the wave forms useful in explaining the operation of the system of Fig. 16.

The vertically multiplexed step shaped pulses, produced by the system above described, may also be horizontally multiplexed according to the following systems. In Figs. 16 and 17 is shown the base wave generator 215 which is respectively connected to channel modulator circuits *a*, *b* and *c* of group I modulator circuit 216 and thence into a mixer 217. These modulator circuits clip the base wave 218 into a series of pulse trains 219, 220 and 221, corresponding to signals *a*, *b* and *c*. The base wave 218 is also passed through line 222 into a delay device 223 which may be similar to that shown at 182, in Fig. 12, to produce a delayed base wave 224 which is then connected to the channel modulator circuits *d*, *e*, and *f* of group II modulator circuits 225 from which are withdrawn pulse trains 226, 227 and 228 respectively, and passed into mixer 217. The delayed wave 224 may then further be passed through line 229 to another delay device similar to 223 and thence to a group III modulator circuits (not shown) to produce more pulse trains which are also connected with the mixer 217. From the mixer 217 the vertically and horizontally multiplexed step shaped pulse wave 230 is withdrawn through line 231 to a suitable transmitter.

Figure 18:
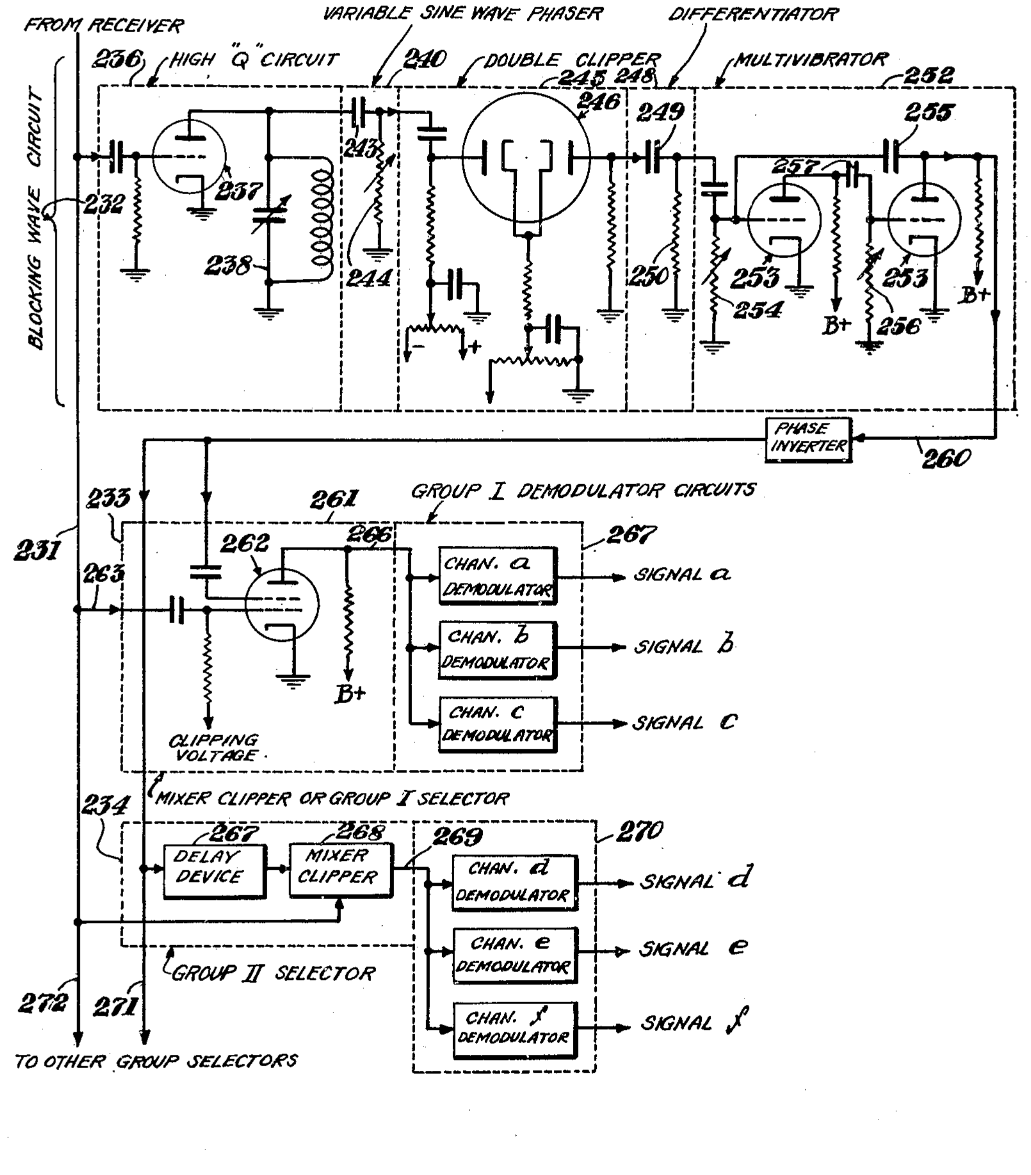
Fig. 18 is a schematic wiring diagram partially in block of a system for separating and demodulating the vertically and horizontally multiplexed complex pulse wave produced in the system of Fig. 16.
Figure 19:
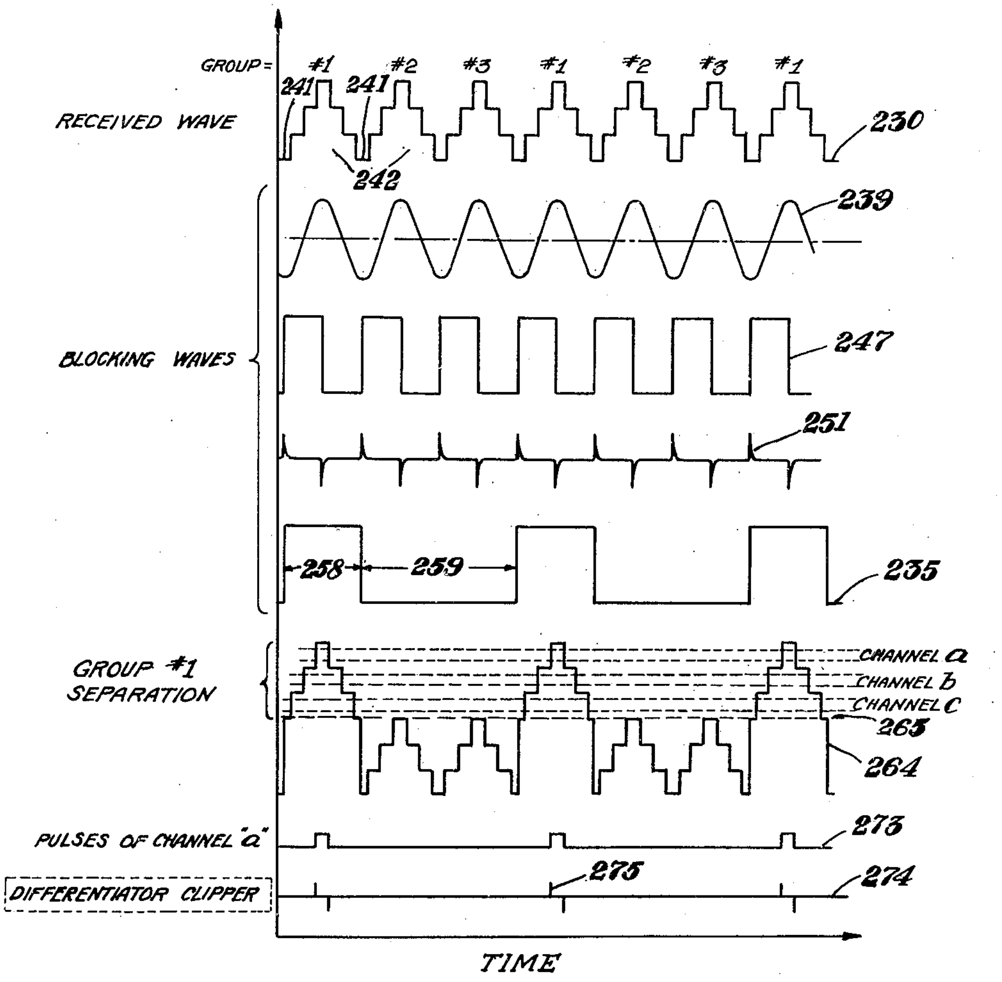
Fig. 19 is a graph of wave forms useful in explaining the operation of the system shown in Fig. 18.

A system for separating the channels of a horizontally and vertically multiplexed pulse wave similar to complex wave 230 is shown in Figs. 18 and 19. The complex wave 230 is passed from the receiver through line 231 to a blocking wave circuit 232 and also to the group selectors 233, 234, etc., for the separation of the pulses of group I, group II, etc. The blocking wave circuit 232 produces the blocking wave 235 from the complex wave 230 by first passing it through a high "Q" circuit 236 comprising a triode 237 and a time constant circuit 238. This high "Q" circuit produces a smooth sine wave 239 which has the same frequency as complex wave 230. The phase of this sine wave 239 is then adjusted in circuit 240 so that the beginning of each cycle thereof is in synchronism and alignment with the space 241 between the two successive step shaped pulses 242 of wave 230. This variable sine wave phaser may comprise a condenser 243 and a variable resistance 244. From the sine wave phaser the adjusted sine wave 239 is passed into a double clipper 245, which may comprise a double diode 246 similar to that shown in Fig. 1, from which is withdrawn the rectangular shaped wave 247. This wave 247 is then differentiated in the differentiator 248, comprising condenser 249 and resistance 250, to form the pulse wave 251. Pulse wave 251 is passed into a tuned multivibrator circuit 252 which may comprise two triodes 253 and two variable time constant circuits consisting of variable resistor 254 and condenser 255 and variable resistor 256 and condenser 257. Multivibrator circuit 252 is so timed that it will produce: (1) pulses 258 on wave 235, which pulses correspond in width to the distance between two successive spaces 241 of the complex pulse wave 230; and will also produce (2) spaces 259 between the pulses 258 so that pulses 258 will have the same frequency as the step shaped pulses of one group. The blocking wave 235 is then passed through line 260 into group I, separator 261 which comprises a tube 262 for mixing it with the complex pulse wave 230, introduced through line 263. This tube 262 may also be biased so that the composite wave 264 (produced by mixing the wave 230 and 235) is clipped at the level 265 so that only the pulses of group I are withdrawn from the plate of tube 262 through line 266. The group I pulses then are passed to demodulator circuits 267 provided with a series of channel demodulators *a*, *b* and *c* from which the corresponding reproduced signals *a*, *b* and *c* are withdrawn.

In order to separate the complex pulses of group II, the wave 235 from line 260 is passed to the group II selector 234 which is provided with a delay device 267 for delaying the pulses 258 so that they will be in alignment with the pulses of group II on the complex wave 230. This delayed blocking wave is then passed into a mixer clipper 268, similar to 261, and mixed with the complex wave 230 from which is withdrawn a pulse wave comprising the pulses of group II and which is passed through line 269 to the group II demodulator circuits 270 for demodulating signals *d*, *e* and *f*.

The pulses of group III may be similarly separated by a group selector (not shown but similar to 234) connected with lines 271 and 272. The separated signal channels on each pulse group may be separated and/or demodulated by any one of the systems previously described. For example, a pulse train 273 is shown corresponding to channel *a* of group I in Fig. 19, and this channel may be differentiated and clipped to form pulse train 274 for time demodulation of the positive pulses 275 according to a circuit previously described.

If desired, the step shaped pulses of wave 230 may be clipped to separate the steps prior to blocking for separating the pulse trains of each signal channel.

*Chapter II–B*

If desired similar groups of step shaped pulses in a horizontal multiplexed complex wave may be separated by synchronizing pulses.

A system for producing such synchronizing pulses is shown in Figs. 20 and 21 wherein the base wave generator 276 producing the wave 277 is first passed through a double clipper 278, similar to 5 shown in Fig. 1, wherein the top of the wave 277 is clipped at levels 279 to produce a pulse wave 280 having synchronizing pulses 281. This wave then passes through line 282 into the mixer 283. The base wave 277 is also connected with delay devices 284, 285, etc., for producing delayed waves 286, 287, etc., respectively. Delayed base wave 286 then may be passed through group I channel modulator circuits 288 such as those described in Chapter II–A above, for producing pulse trains corresponding to channels of signals *a*, *b*, *c* and *d* as shown. These resulting pulse trains are separately passed through lines 289 into mixer 283. Similarly, signals *e*, *f*, *g* and *h* are modulated on further delayed base wave 287 in the group II modulator circuits 290, wherein another group of pulse trains are produced and passed through lines 291 into the mixer 283. From mixer 283 is withdrawn through line 292 a complex pulse wave 293 having synchronizing pulses 281 between each similar group of step shaped pulses 294.

The wave 293 may be separated and demodulated in a circuit similar to that shown in Fig. 22. The incoming wave is passed through line 295 and thence into a pulse width selector 296, similar to the pulse width demodulator shown in Fig. 4 and having tube 64, time constant circuit 65, damping tube 66, threshold clipping tube 67, and the circuits shown therewith. This pulse width selector separates the synchronizing pulses 281 from the other wider pulses 294 of the wave 293 thereby again producing a pulse wave similar to 280 shown in Fig. 21. This synchronizing pulse wave similar to 280 is passed through line 297 into a multivibrator 298, similar to that shown in 252 in Fig. 18, from which is produced a blocking wave similar to 235, shown in Fig. 19. This blocking wave is then coupled to the group I selector 299 similar to group I selector 233 in Fig. 18, and thence to group I demodulator circuits 300 from which are withdrawn signals *a*, *b*, *c* and *d*. Group II pulses are separated in group II selector 301, similar to group II, 234 and having a delay device, and from thence they are demodulated in the group II demodulator circuits 302 from which are withdrawn signals *e, f, g* and *h,* as described in Chapter II–A above. The other groups are similarly separated in channel group selectors (not shown) connected to lines 303 and 304 of the received complex pulse wave and of the blocking wave respectively.

Although only six separate signals are shown modulated on a single step shaped pulse, this is by no means a limitation on the number which may be sent. More steps may be provided if the base wave is of a sufficient amplitude and frequency so that the time modulation of one pulse channel will not overlap that of another pulse channel. The horizontal multiplexing of such step shaped pulses may include ten or more in each repeated group of different pulse trains provided the frequency of the carrier for the wave is sufficiently high.

While the principles of the invention have been described in connection with several specific embodiments, it is to be clearly understood that the above descriptions are made only by way of example and not as limitations on the scope of the invention as defined in the objects and the accompanying claims.

I claim:

1. In a multichannel system, means to produce a pulse having vertically disposed portions of different widths and means to modulate the width of each such portion within given limits according to the instantaneous value of a signal.

2. In a multichannel system, means to produce a pulse having vertically disposed portions of different widths and means to time modulate each such portions within given limits according to the instantaneous value of a signal.

3. In a multichannel system, means to produce a pulse having vertically disposed portions of different widths and means to time modulate the edge of each such portion within given limits according to the instantaneous value of a signal.

4. A system for producing a complex pulse wave carrying a plurality of channels of signal energy, comprising means for producing a plurality of pulse trains respectively signal modulated in a time characteristic with the energy from said signal sources, and means to superimpose the pulses of at least two of said pulse trains to produce said complex wave, the pulses of each separate superimposed train having different basic widths, said means for producing the pulse trains including means to time modulate the pulses thereof according to the instantaneous values of the corresponding signal energy.

5. A system for producing a complex pulse wave carrying a plurality of channels of signal energy, comprising means for producing a plurality of pulse trains respectively signal modulated in a time characteristic with the energy from said signal sources, and means to superimpose the pulses of at least two of said pulse trains to produce said complex wave, the pulses of each separate superimposed train having different basic widths, said means for modulating the pulse trains including means to width modulate the pulses thereof according to the instantaneous values of the corresponding signal energy.

6. A system for producing a complex pulse wave carrying a plurality of channels of signal energy, comprising means for producing a plurality of pulse trains respectively signal modulated in a time characteristic with the energy from said signal sources, and means to superimpose the pulses of at least two of said pulse trains to produce said complex wave, the pulses of each separate superimposed train having different basic widths, said means for modulating the pulse trains includes means to time modulate at least one of said signals on one of said pulse trains according to the instantaneous values of the corresponding signal energy and means to width modulate at least another of said signals on another of said pulse trains according to the instantaneous values of the corresponding signal energy.

7. A system for producing a complex pulse wave carrying a plurality of channels of signal energy, comprising: means to produce a base wave, a plurality of sources of signal energy, means controlled by said base wave to produce a plurality of pulse trains respectively signal modulated with the energy from said signal sources, and means to superimpose the pulses of at least two of said pulse trains to produce said complex wave, the pulses of each separate superimposed train having different basic widths.

8. A system for producing a step shaped pulse on a pulse wave wherein each pulse carries at least two channels of signal energy comprising: at least two sources of signal energy, means to produce a base wave having a sloping edge, means for clipping said base wave along said sloping edge at various levels corresponding to the energy from said signal sources to produce at least two pulse trains corresponding to said signal sources, the pulses of each train having different basic widths and having the same frequency, and means to superimpose the pulses of at least two of said pulse trains to produce step shaped pulses on said pulse wave.

9. A system for producing a step shaped pulse on a pulse wave wherein each pulse carries at least two channels of signal energy comprising: at least two sources of signal energy, means to produce a sine base wave, means to cusp modulate said base wave corresponding to energy from said signal sources, means to clip said modulated cusp waves at different amplitude levels for different channels to produce pulse trains respectively signal modulated with the energy from said signal sources, the pulses of at least two separate trains having different basic widths and having the same frequency and means to superimpose at least two of said pulse trains having the same frequency to produce said step shaped pulse on said pulse wave.

10. A multichannel system for producing a complex pulse wave wherein at least two signal are vertically multiplexed on a single pulse and these pulses are horizontally multiplexed with other vertically multiplexed pulses comprising: a plurality of sources of signal energy, a base wave source, means to delay said base wave to produce a delayed wave out-of-phase with the original base wave, separate means controlled by said base wave and said delayed wave to each produce a plurality of pulse trains respectively signal modulated with energy from a separate one of said signal sources, the pulse trains produced from said delayed base wave having a frequency out-of-phase with the pulse trains produced from the original base wave, means for superimposing at least two of said pulse trains produced from said base wave, means for superimposing at least two of said pulse trains produced from said delayed wave, and means for interleaving the superimposed pulses to produce said complex wave.

11. A multichannel system for producing a complex pulse wave wherein at least two signals are vertically multiplexed on a single pulse and these pulses are horizontally multiplexed with other vertically multiplexed pulses comprising: a plurality of sources of signal energy, a base wave source, means to produce a synchronizing pulse from said base wave, means to delay said base wave to produce at least two delayed base waves out-of-phase with each other and said original base wave, means controlled by each of said delayed base waves to produce a plurality of pulse trains each respectively signal modulated with energy from a separate one of said signal sources, the pulses of each train produced from a given one of said delayed base waves having the same frequency and being out-of-phase with the pulses of the pulse trains produced from the other delayed base waves, means for superimposing at least two of the trains produced from said given delayed base wave, and means for superimposing at least two of the trains produced from said other delayed base wave, and means to mix said synchronizing pulses and said pulse trains to produce said superimposed complex wave.

12. In a multichannel communication system wherein a complex pulse wave having at least two signals vertically multiplexed on each pulse thereof and wherein said pulses are horizontally multiplexed, a system for demodulating said complex pulse wave comprising: means for producing a blocking wave from said complex wave, means employing the blocking wave for separating the horizontally multiplexed pulses, means for separating the vertically multiplexed pulses to produce a plurality of pulse trains corresponding to each signal modulated on said complex wave, and separate means for demodulating said separate pulse trains to reproduce said signals.

13. In a multichannel communication system having at least two signals vertically multiplexed on each pulse thereof and wherein said pulses are horizontally multiplexed and wherein similar groups of horizontally multiplexed pulses are separated by synchronizing pulses, a system for separating said complex waves comprising: means for producing a blocking wave from said synchronizing pulses, means for employing said blocking wave for separating the horizontally multiplexed pulses, and means for separating the vertically multiplexed pulses to produce a plurality of pulse trains corresponding to each of said signals on said complex wave.

14. In a multichannel communication system wherein a complex pulse wave having at least two signals vertically multiplexed on each pulse thereof and wherein said pulses are horizontally multiplexed and wherein similar groups of horizontally multiplexed pulses are separated by synchronizing pulses, a system for demodulating said complex wave comprising: means for producing a blocking wave from said synchronizing pulses, means for employing said blocking wave for separating the horizontally multiplexed pulses, means for separating the vertically multiplexed pulses to produce a plurality of pulse trains corresponding to each of said signals on said complex wave, and means to demodulate each of said pulse trains to reproduce said signals.

15. A multichannel communication system comprising: a base wave generator to produce a base wave having a sloping edge, at least two signal sources, at least two means for clipping said base wave along said sloping edge at various levels corresponding to the energy from said signal sources within a given range, different level ranges corresponding to different signal channels, to produce trains of time modulated pulses corresponding to each of said channels, means to superimpose at least two of said trains of pulses to form a single complex wave, a transmitter for transmitting said complex wave, a receiver for receiving said transmitted complex wave, means to separate said complex wave into each train of each said signal channel, and separate means to demodulate each said train into its corresponding signal.

16. A method for producing a step shaped pulse on a pulse wave for carrying a plurality of channels of signal energy comprising: producing a plurality of pulse trains respectively signal modulated with the energy from said signal sources, said pulse trains having pulses of different basic widths and at least two of said trains having the same frequency, and superimposing the pulses of at least two pulse trains having the same frequency to produce the step shaped pulse on said complex wave.

DONALD D. GRIEG.

REFERENCES CITED

The following references are of record in the file of this patent:

UNITED STATES PATENTS

| Number | Name | Date |
|---|---|---|
| 2,199,634 | Koch | May 7, 1940 |
| 2,266,194 | Guanella | Dec. 16, 1941 |
| 2,311,021 | Blumlein | Feb. 16, 1943 |
| 2,401,384 | Young | June 4, 1946 |
| 2,406,790 | Beatty | Sept. 3, 1946 |